Aug. 4, 1953 W. F. ALLER 2,647,396
PNEUMATIC GAUGING DEVICE
Filed Sept. 27, 1947
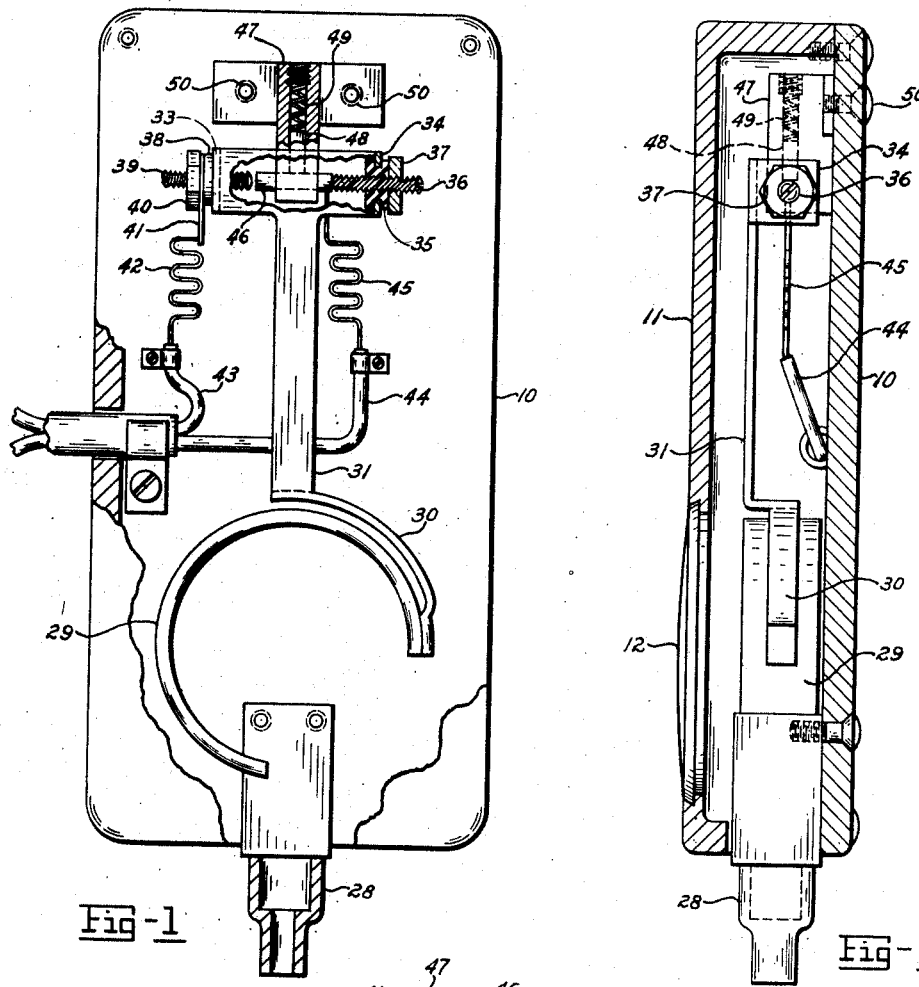
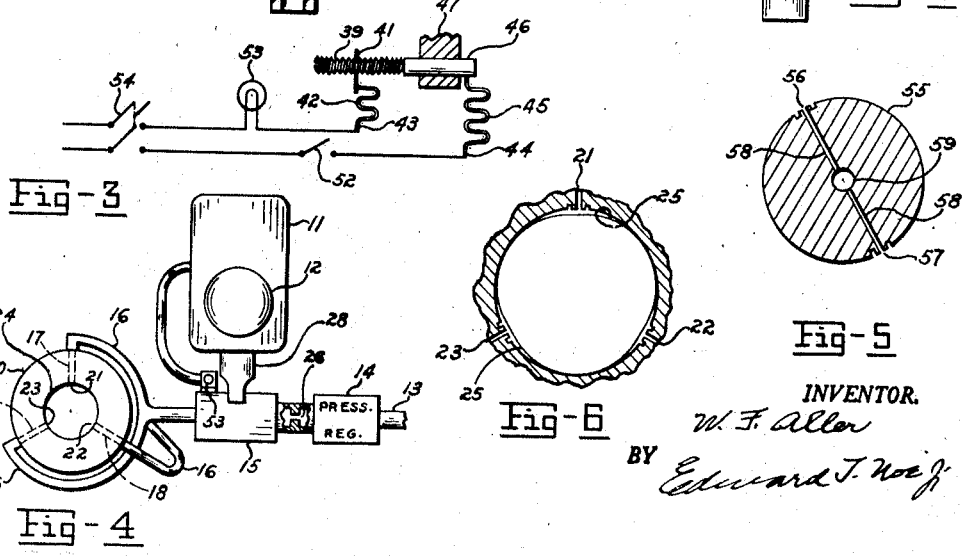
INVENTOR.
W. F. Aller
BY Edward J. Noe Patented Aug. 4, 1953

2,647,396

UNITED STATES PATENT OFFICE 2,647,396

PNEUMATIC GAUGING DEVICE

Willis Fay Aller, Dayton, Ohio, assignor to The Sheffield Corporation, Dayton, Ohio, a corporation of Ohio Application September 27, 1947, Serial No. 776,512

10 Claims. (Cl. 73—37.5)

This invention relates to gauging devices for gauging or comparing the difference in a dimension of a workpiece at different locations on the workpiece to see whether or not such difference exceeds a predetermined limit.

One object of the invention is the provision of a gauging device of the character mentioned in which there is provision for automatically setting a contact element merely by moving the workpiece with respect to a gauging head to present a dimension of the workpiece at different locations on the workpiece to a gauging zone so that the second or repeat movement of the workpiece then controls an indicating circuit in accordance with the amount of variation of the dimension at the different locations gauged.

Another object is the provision of a gauging apparatus for checking a dimension at different locations, in which a movable member controlled by the workpiece size first pre-sets one of a pair of contacts and thus controls the closing of a circuit during the gauging operation if the difference in the dimension checked at different locations on the workpiece exceeds a predetermined limit, such operation being effective merely by operating the workpiece in a gauging head.

Another object is the provision of a gauging apparatus to determine if an out-of-round condition exceeds a predetermined limit merely by rotational movement of the workpiece in a gauging head.

Other objects and advantages of the invention will be apparent from the following description, the appended claims and the accompanying drawing in which a preferred form of the invention has been illustrated.

Referring more particularly to the drawing, Fig. 1 is a front elevation of the circuit controller applicable to the present invention, certain portions being broken away for purpose of illustration;

Fig. 2 is a side elevation of the controller;

Fig. 3 is a diagrammatic view showing the electrical connections to the circuit controlling contact;

Fig. 4 is a front elevation of a gauging apparatus embodying the present invention and showing the association of the circuit controller, the work head, and the other parts of the apparatus;

Fig. 5 is a transverse sectional view through a modified form of work head; and

Fig. 6 is a diagrammatic illustration showing an out-of-round condition of a workpiece.

Referring more particularly to the drawing in which the same reference numerals have been applied to like parts in the several views, 10 designates the supporting plate of a circuit controller, having a cover plate 11 within which the operating mechanism of the controller is enclosed. The cover plate 11 is preferably provided with an inspection window 12. In the particular adaptation of the invention illustrated, the gauging is accomplished by gauging orifices the flow through which is controlled according to the size of the workpiece. Thus, as shown in Fig. 4, the system is supplied with air under pressure coming in through a supply pipe 13. A pressure regulator 14 controls the pressure supply to a supply block 15 from which the fluid travels through conduits 16 to passages 17, 18 and 19 in a work head 20. These passages terminate in nozzles 21, 22 and 23 controlled by the workpiece. The work head 20, as shown, is for gauging an outside dimension of an annular article such as a piston, shaft, plug or any other device of such size that it can be received with small clearance in the hole 24.

For checking an out-of-round condition of the workpiece 25 there may be only two diametrically opposed gauging nozzles in the work head, or only a single nozzle, where it is particularly desirous of finding an elliptical condition, but where, as illustrated in Figs. 4 and 6 for example, it is particularly desirous of finding an out-of-round condition of a triangle or clover leaf character, the work head is supplied with three gauging nozzles equally spaced apart and similarly connected to a common fluid supply conduit so that the fluid flow through the orifices determines the pressure in the block 15, there being a suitable restriction 26 between that block and the pressure regulator so that the pressure and the flow in the block 15 varies in accordance with the workpiece dimension.

With the workpiece applied to the gauging nozzles 21, 22 and 23 in the position shown in Fig. 6, it will be obvious that a much larger flow obtains through these nozzles with the work in the position shown than would be the case if the work were rotated 60 degrees or if the work head were rotated on the work to that extent. The dimension that would be gauged by the arrangement as shown in Fig. 6 would be an average of three dimensions transverse of the work axis and would give an indication of the diameter of a circle defined by the points of minimum radius of the workpiece. By rotating the workpiece 60 degrees the amount of pressure in the block 15 would give an indication of the diameter of the circle defined by the maximum radius lines of the workpiece.

The block 15 is connected to and carries a coupling 28 having a fluid passage connected to the curved pressure responsive flexible tube 29, similar to a Bourdon tube arrangement. The free closed end of the tube 29 is secured to a curved plate 30 which extends upwardly away from the coupling 28 to provide a movable member 31 which is swung to different positions in accordance with the dimension checked, such swinging motion being caused by the winding and unwinding action of the pressure tube 29 due to pressure changes. With no workpiece in place in the work head there is a substantial flow of air through the gauging nozzles and a proportionally reduced pressure applied to the tube 29 so that the tube would then move the member 31 towards the right. With a higher pressure in the tube 29, produced by the restriction offered by the workpiece to the flow of air through the gauging nozzles, the member 31 would swing over towards the left as viewed in Fig. 1 to an extent determined by the size of the workpiece.

The upper end of member 31 is extended laterally and provided with two rearwardly turned ears 33 and 34. Ear 34 has an insulating bushing 35 internally threaded to receive a stop screw 36 which is held in adjusted position by a lock nut 37 or by any other suitable means. Ear 33 is similarly provided with an insulating bushing 38 internally threaded to receive a stop screw 39 having a lock nut 40. A metallic washer 41 is interposed between the lock nut 40 and the bushing and is electrically connected by a flexible coil 42 to a lead wire 43. A second lead wire 44 is electrically connected by a flexible coil 45 to a contact element 46 shown as a small roll or pin slidably mounted for axial movement in a holding block 47 which is held by screws 50 to the back plate 10. A spring pressed friction shoe 48 is preferably arranged in the holding block and is pressed by spring 49 against the side of the pin 46 so that the pin is held with a light frictional restraint against endwise movement but can be moved in the direction of its length by pressure applied to its ends. Normally there is a suitable spacing between the end of the contact element 46 and the two stop screws 36 and 39, the amount of this clearance or spacing being predetermined in accordance with the desired tolerance condition. By adjusting one or the other of the stop screws, the clearance can be increased or decreased.

The lead wires 43 and 44, as shown in Fig. 3, are in circuit with an "on and off" switch 52 and an indicator 53, which may be in the form of an electric light bulb. Power is supplied from any suitable source through switch 54. As will be apparent from that figure, a circuit is closed through the indicator 53, switch 52 being closed, whenever the contact element 46 engages contact element or stop 39. If the contact 39 is moved to the left, as viewed in Fig. 3, by corresponding movement of the movable member 31, due to a pressure increase in the tube 29, the circuit will be broken.

In a gauging operation the operator places workpiece 25 in the work head 24 and merely rotates the workpiece about its axis at least 120 degrees and preferably less than half of a revolution. This has the effect of automatically setting the contact element 46 in accordance with the maximum diameter of a circle defined by the maximum radius of the workpiece. This action obtains because, as the movable member 31 swings to the left, due to the pressure increase, the end of the stop screw 36 forces the contact element 46 endwise towards the left as viewed in Fig. 1 but doesn't return it. The extent to which the contact element 46 is forced to the left is dependent upon the maximum radius of the workpiece.

Having automatically adjusted the contact element 46 merely by rotating the work through a part of a revolution, the operator then does the actual gauging operation merely by rotating the workpiece either forwardly or backwardly through 120 degrees further travel and watches the indicator 53 to see whether or not it is energized. During this gauging rotation, the contact screw 39 will engage the end of the contact element 46 if the member 31 swings over far enough to the right due to a pressure decrease caused by a decrease in the dimension checked. Thus the indicator 53 will be energized to show the operator there is too much variation in the roundness to satisfy the required tolerance condition for which the device has been preset. If during this gauging rotation of the work the indicator 53 is not energized, it will show the operator the swinging movement of the member 31 is not large enough to take up the clearance between the contact element 46 and the contact screw 39, and the difference in the dimension of the workpiece at the different locations on the workpiece gauged is small enough to satisfy the required conditions.

Obviously by changing the setting of the contact screw 39 or the contact screw 36, the device may be made responsive to greater or smaller differences in the dimension checked, or tolerance at the different locations gauged.

When the article being gauged is removed from the work head, there is a considerable reduction in pressure in the flexible tube 29 so that the movable member 31 swings over far enough to the right for the contact screw 39 to move the contact element 46 over to the right in position to be reset by contact screw 36 when the next workpiece is applied.

The gauging device obviously is not limited to checking a clover leaf out-of-round condition of an external surface. According to the particular form of the work head, the device may have other adaptations, either for measuring the amount of taper in a workpiece by axially moving the workpiece longitudinally for automatically setting the contact element 46 so that a repeat or return movement of the workpiece can perform the actual gauging operation, or for measuring a true diameter of an internal surface. Thus, Fig. 5 shows a work head for receiving a hollow workpiece, and in this form of construction the head 55 has a pair of opposed nozzles 56 and 57 connected by fluid passages 58 to a common supply passage 59 adapted for connection to the block 15.

While the apparatus herein described constitutes a preferred embodiment of the invention, it is to be understood that the invention is not limited to the precise apparatus described, and that changes may be made therein without departing from the scope of the invention which is defined in the appended claims.

What is claimed is:

1. Gauging apparatus for checking the difference in a dimension of a workpiece at different locations on the workpiece as the workpiece is moved to present such different locations to a gauging zone, comprising a work head having an annular portion for movably receiving the workpiece to be gauged in concentric relation and having a work controlled gauging device arranged for cooperative association with the surface of the work for checking at least one transverse dimension of a workpiece, a movable member having an operative connection to said gauging device and controlled by said gauging device in accordance with the dimension checked, an electric circuit including a circuit controlling element carried in the path of movement of and engageable by said movable member, indicating means in said circuit controlled by said controlling element, and a shifting means on said movable member engageable with said element for automatically shifting said controlling element in accordance with the limit of position attained by said movable member as the workpiece is moved to present its different locations to be gauged to the gauging zone, so that a repeat movement of the workpiece controls said indicating means when the difference in the dimension gauged exceeds a predetermined amount.

2. Gauging apparatus for checking the difference in a dimension of a workpiece at different locations on the workpiece as the workpiece is moved to present such different locations to a gauging zone, comprising a work head for movably receiving the workpiece to be gauged and having a work controlled gauging device arranged for cooperative association with the surface of the work for checking at least one transverse dimension of a workpiece, a movable member having an operative connection to said gauging device and controlled by said gauging device in accordance with the dimension checked and having a circuit controlling element, a second circuit controlling element normally spaced from the first controlling element, an electrical circuit having indicating means controlled by said elements when they are brought into engagement, and means provided on said movable member for automatically shifting one of said elements relatively to the other to vary their spacing in accordance with the limit of position attained by the said movable member as the workpiece is moved to present its different locations to be gauged to the gauging zone, so that a repeat movement of the workpiece energizes said responsive means when the difference in dimension gauged exceeds a predetermined amount.

3. Gauging apparatus for checking the difference in a dimension of a workpiece at different locations on the workpiece as the workpiece is moved to present such different locations to a gauging zone, comprising a work head for movably receiving the workpiece to be gauged and having a work controlled gauging orifice for checking at least one transverse dimension of a workpiece, means for supplying fluid under pressure to said orifice, a movable member having an operative connection to said gauging orifice and controlled by said gauging orifice in accordance with the flow of fluid through said orifice and having an electric contact, a second contact normally spaced from the first contact, an indicator circuit including an indicator having electrical connections to said contacts for operation when a circuit is closed through said contacts, and means including a frictionally supported part in the path of travel of said movable member for automatically shifting one of said contacts relative to the other to vary their spacing in accordance with the limit of position attained by the said movable member as the workpiece is moved to present its different locations to be gauged to the gauging zone, so that a repeat movement of the workpiece energizes the indicator circuit when the difference in the dimension checked exceeds a predetermined amount.

4. Gauging apparatus for checking an out-of-round condition of a workpiece comprising a work gauging head for rotatably receiving a round workpiece to be gauged, a contact element, a holder in which said element is frictionally supported and axially movable, a pair of opposed stops for engaging the ends of said element and normally spaced apart a distance in excess of the length of said element, an indicator, means including an electric circuit connected to said contact element and one of said stops for energizing said indicator when said element contacts said one of said stops, a movable member for relatively moving said element and said stops, the element being arranged in the path of travel of said movable member, and means cooperatively associated with the surface of the work and carried in said gauging head and having an operative connection to said movable member for moving said member in accordance with changes in a dimension of the workpiece.

5. Gauging apparatus for checking an out-of-round condition of a workpiece comprising a work gauging head for rotatably receiving a round workpiece to be gauged, a contact element, a holder in which said element is axially movable, a pair of opposed stops for engaging the ends of said element and normally spaced apart a distance in excess of the length of said element, means for relatively adjusting said stops to change their normal spacing, an indicator, means including an electric circuit connected to said contact element and one of said stops for energizing said indicator when said element contacts said one of said stops, a movable member operative in a predetermined path providing for relatively moving said element and said stops, and means including a work controlled gauging orifice, a source of fluid under pressure and a fluid pressure responsive means operatively connected to the orifice and the said member for moving said member in accordance with at least one transverse dimension of the workpiece.

6. Gauging apparatus for checking an out-of-round condition of a workpiece comprising a movable member, a work gauging head for rotatably receiving a round workpiece to be gauged, means including a work controlled gauging device and an operative connection from said gauging device to said member for moving said member in accordance with at least one transverse dimension of the workpiece, a contact element, a holder in which said element is axially movable, a pair of opposed stops carried by said member for engaging the ends of said element and normally spaced apart a distance in excess of the length of said element, an indicator, means for energizing said indicator when said element is contacted by one of said stops, the other of said stops serving to automatically position said element in the holder while the workpiece is being rotated on said gauging head.

7. Gauging apparatus for checking the difference in a dimension of an article at different locations on the article as the article is moved to present such different locations to a gauging zone comprising a work head for movably receiving the article to be gauged, a movable work sizing member, means for operating said member in accordance with changes in the dimension presented to the gauging zone, a movable switch controlling element, a frictional support for said element, stop means engageable with said element for moving said element in one direction in its frictional support, said stop means carried by said movable member and said element being operable in its frictional support in the path of movement of said movable member, switch means controlled by said element when the element has a predetermined spacing from the stop means, and indicating means controlled by said switch means.

8. Gauging apparatus responsive to the amount of out of roundness of an article having an axis extending at right angles to the plane in which out of roundness may be present, comprising a work head adapted for interfitting engagement with the article, the work head and the article being adapted for relative rotation of one with respect to the other and about the article axis, a movable work sizing member, a gauging device for cooperative association with the surface of the article, means controlled by said gauging device for operating said member in accordance with a dimension of the article in a plane at right angles to the article axis, switch means including a pair of electric contacts controlled by said movable member, and automatically operable adjusting means having an operative connection to said work sizing member for control thereby, said adjusting means including a frictionally supported adjusting member and a stop which limits the movement of said adjusting member in one direction for automatically setting the point at which the movable member effects control of said switch means and in accordance with the limit of position attained by said movable member as relative movement of the article and the work head takes place in a pregauging operation so that the switch means is subsequently effective or ineffective according to the extent of movement of the movable member in one direction during the gauging operation, and indicating means controlled by said switch means.

9. Gauging apparatus for checking the difference in a dimension of an article at different locations on the article as the article is moved relatively to a gauging zone to present such different locations to the gauging zone, comprising a work head adapted for interfitting association with the article, a movable work sizing member and means for operating such member in accordance with changes in the dimension presented to the gauging zone; switch means operated by said sizing member when the sizing member is moved to a switch operating position and adjusting means providing for the automatic adjustment of the switch operating position in accordance with a limit of position attained by said sizing member as different dimensions are presented to the gauging zone in a pregauging operation so that the switch means is subsequently effective or ineffective according to the extent of movement imparted to the sizing member in one direction during the gauging operation, said adjusting means comprising a frictionally supported element operable in one direction by said sizing member as the sizing member moves in one direction and stop means for moving said element in the opposite direction after a predetermined lost motion of the sizing member as the sizing member moves in the opposite direction, and indicating means controlled by said switch means.

10. Gauging apparatus as set forth in claim 9 in which the work head and the article are relatively rotatable about concentric axes, and means for adjusting the amount of lost motion.

WILLIS FAY ALLER.

References Cited in the file of this patent
UNITED STATES PATENTS

| Number | Name | Date |
|---|---|---|
| 1,445,389 | Clark | Feb. 13, 1923 |
| 1,586,156 | Keller | May 25, 1926 |
| 1,779,355 | Bodenhamer | Oct. 21, 1930 |
| 1,927,750 | Mennesson | Sept. 19, 1933 |
| 2,074,753 | McClain | Mar. 23, 1937 |
| 2,254,812 | Aller | Sept. 2, 1941 |
| 2,287,784 | Cunningham | June 30, 1942 |
| 2,384,519 | Aller | Sept. 11, 1945 |
| 2,448,653 | Aller | Sept. 7, 1948 |